July 17, 1934.  H. SHAPIRO ET AL  1,966,691
TRANSMISSION APPARATUS
Filed May 20, 1932  4 Sheets-Sheet 1
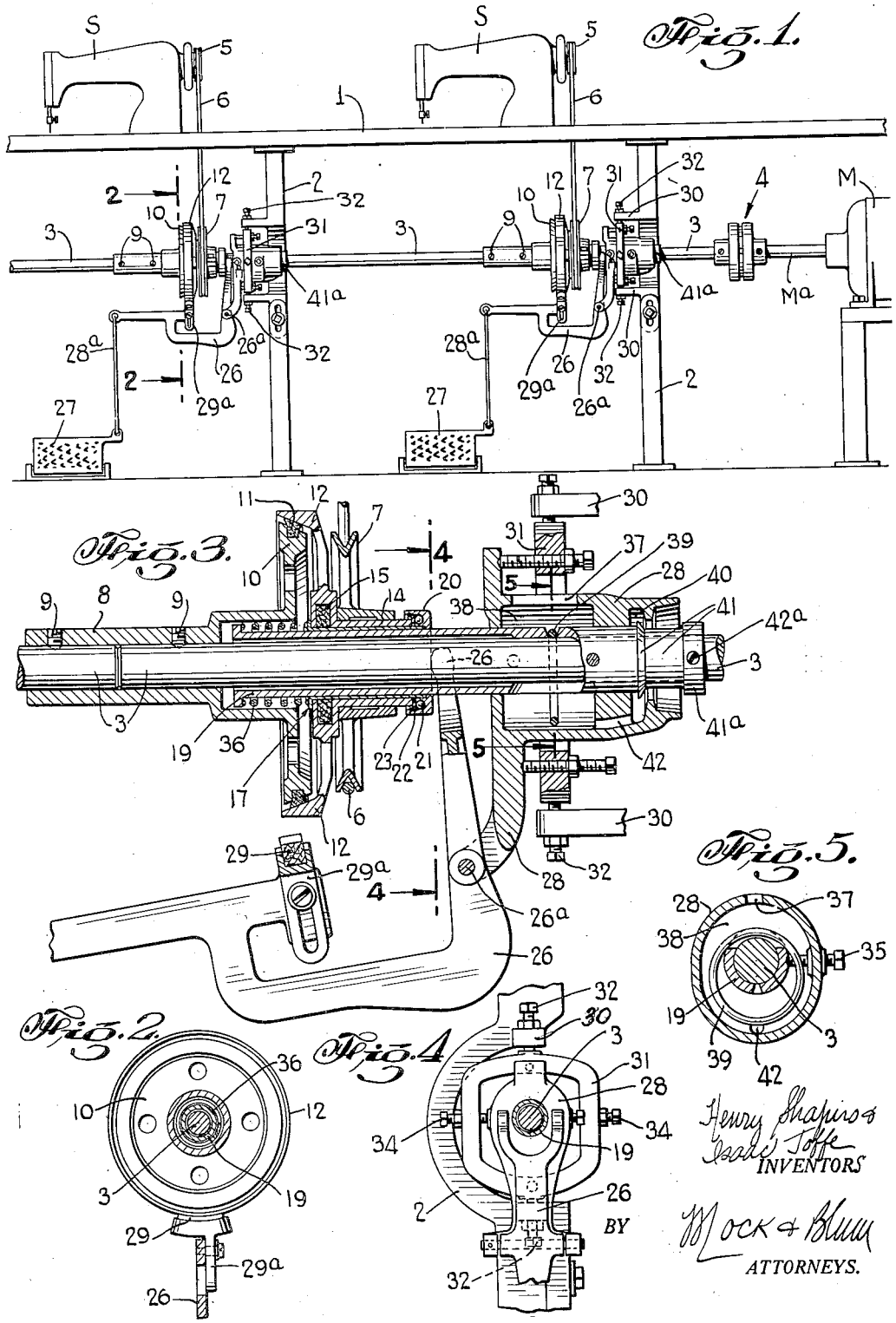

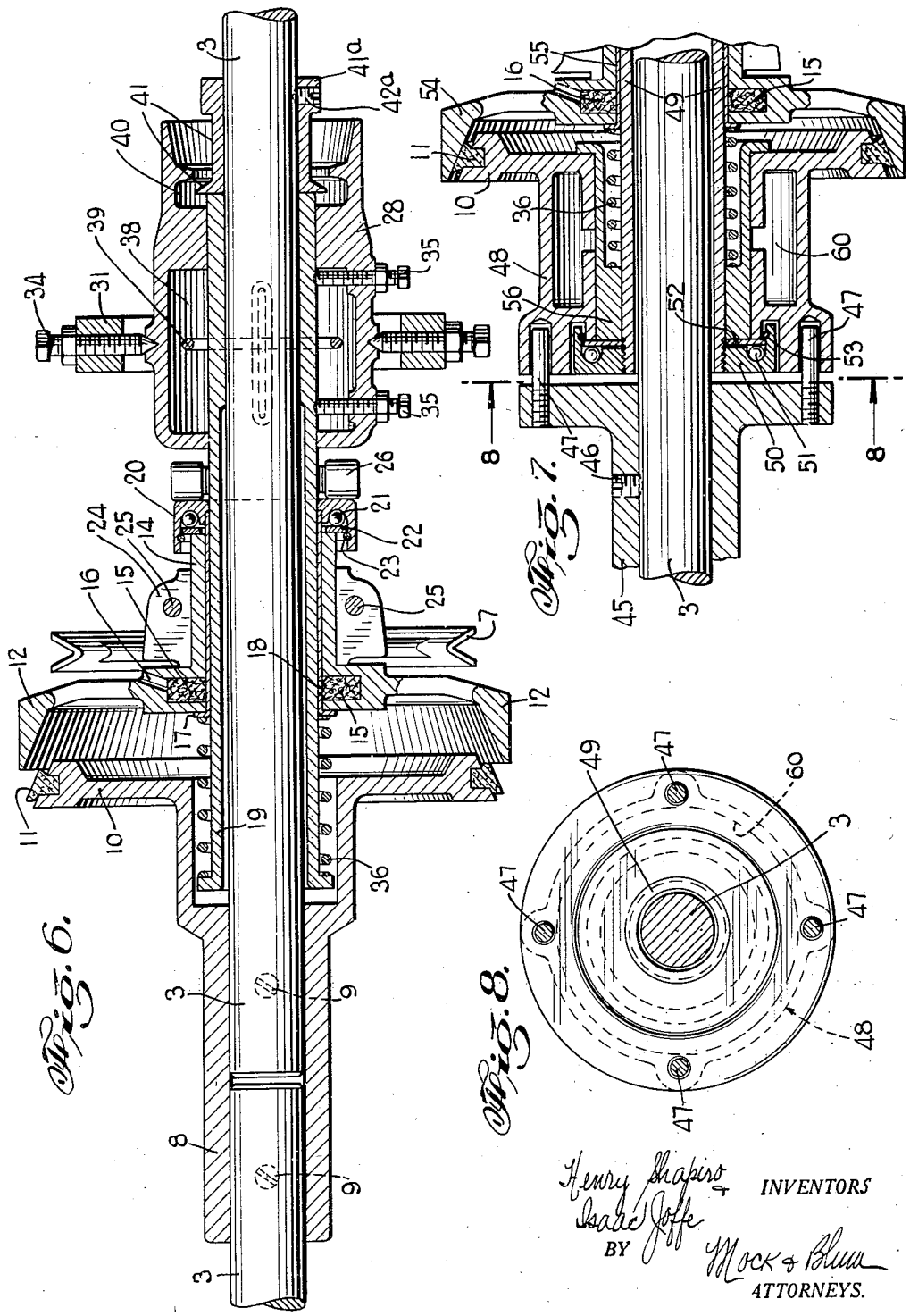

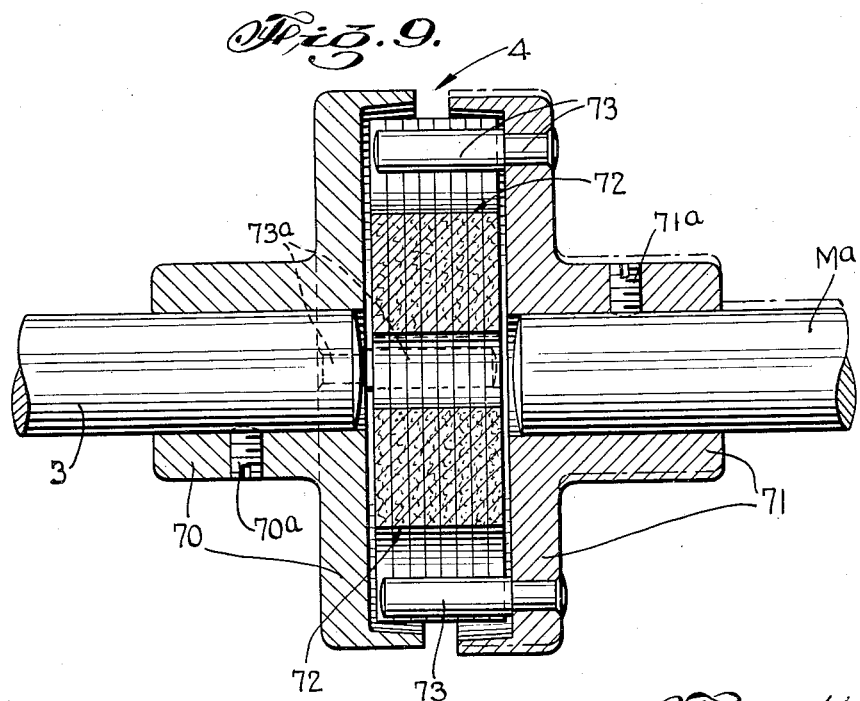
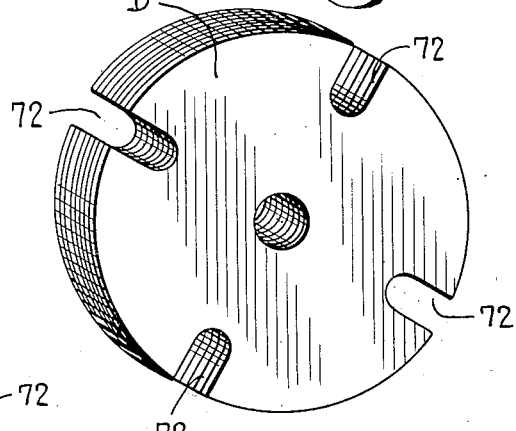
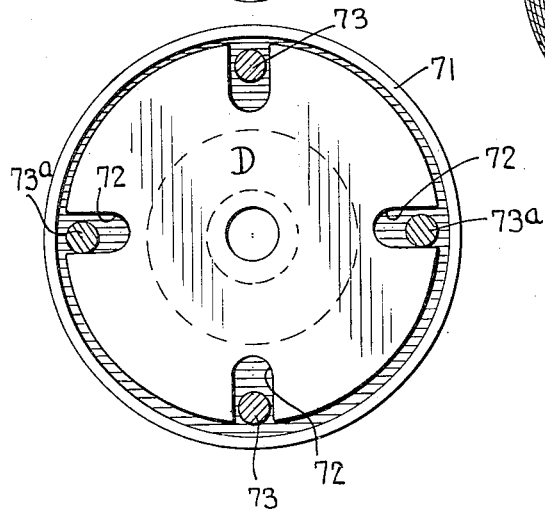

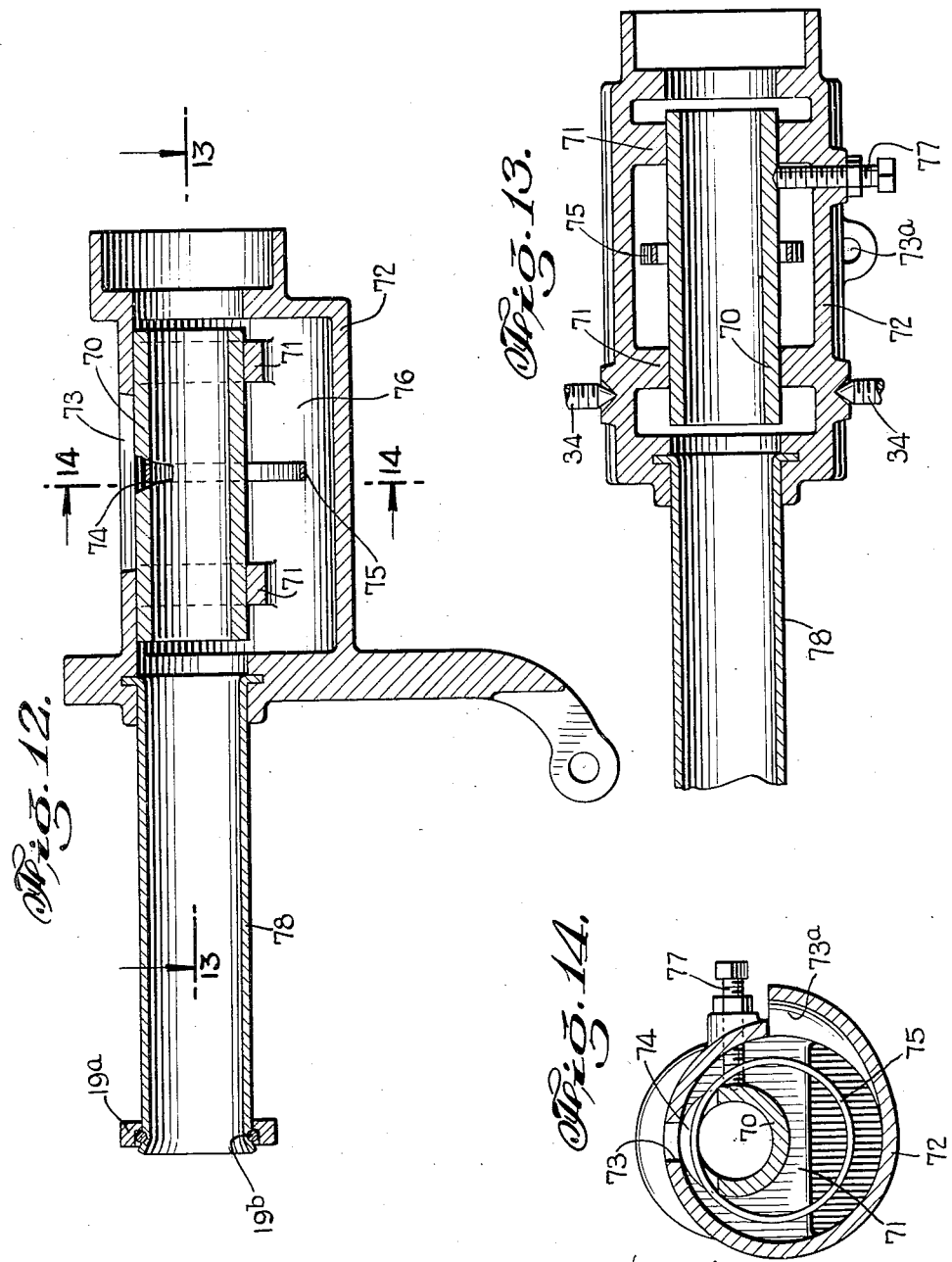

Patented July 17, 1934

1,966,691

UNITED STATES PATENT OFFICE 1,966,691

TRANSMISSION APPARATUS

Henry Shapiro, Bronx, and Isaac Joffe, Brooklyn, N. Y.

Application May 20, 1932, Serial No. 612,462

5 Claims. (Cl. 192—17)

This invention relates to a new and improved transmission apparatus.

One of the objects of this invention is to provide a new and improved transmission apparatus of the type shown in U. S. Patent No. 1,358,471 issued on Nov. 9, 1920.

Another object of this invention is to provide an improved transmission apparatus which can be very easily operated.

Other objects of our invention will be set forth in the following description and drawings which illustrate a preferred embodiment thereof, it being understood that the above general statement of the objects of our invention is intended merely to generally explain the same and not to limit it in any manner.

Fig. 1 is a side elevation.

Fig. 2 is a sectional view on the line 2—2 of Fig. 1.

Fig. 3 is an enlarged detail sectional view.

Fig. 4 is a sectional view on the line 4—4 of Fig. 3.

Fig. 5 is a sectional view on the line 5—5 of Fig. 3.

Fig. 6 is an enlarged detail sectional view corresponding to a section taken at right angles to Fig. 3.

Fig. 7 illustrates a modification.

Fig. 8 is a sectional view on the line 8—8 of Fig. 7.

Fig. 9 illustrates an improved coupling which forms the part of this invention.

Fig. 10 is an inner view of one of the coupling members.

Fig. 11 is a perspective view showing the coupling disks.

Fig. 12 is a sectional view, showing a different embodiment of the bearing sleeve and certain accessory parts.

Fig. 13 is a sectional view on the line 13—13 of Fig. 12.

Fig. 14 is a sectional view on the line 14—14 of Fig. 13.

As shown in Fig. 1, the invention is illustrated as applied to a sewing machine control, for which it is particularly adapted, although the invention is not necessarily limited to this specific purpose. A series of sewing machines S are mounted upon a suitable table 1, which is supported upon suitable frame-work 2. A series of shafts 3 are mounted in suitable bearings, and the end shaft 3 may be connected to the electric motor M, by means of a coupling device 4.

Each of the sewing machines S is provided with means whereby it can be connected to and disconnected from the respective shaft 3, so that the sewing machine can be driven or can remain stationary. For this purpose each of the sewing machines is provided with a driven pulley 5, which is driven by means of a drive pulley 7, and a belt 6.

As shown more particularly in Figs. 3 and 6, each of the shafts 3 has a sleeve 8 connected thereto by means of screws 9 which enter suitable openings in the shaft 3. The screws 9 may be ordinary set-screws if desired. Each sleeve 8 is integral with or is otherwise suitably connected to a clutch member 10 which is provided with an annular friction member 11, the outer periphery of said friction member 11 being suitably tapered. The male clutch member 10 cooperates with a female clutch member 12 whose inner periphery is tapered so as to correspond to the shape of the member 11. The clutch member 12 is integral with a sleeve 14, and this sleeve 14 is provided with a mass 15 of any suitable absorbent material, and the sleeve 14 is provided with one or more oil inlets 16, by means of which the mass 15 can be kept saturated with lubricating oil.

As shown in Fig. 6, the sleeve 14 has a bushing 17 suitably connected thereto, so that the bushing 17 and the sleeve 14 slide in unison, in a direction parallel to the axis of the shaft 3.

As shown in the lower part of Fig. 6, this bushing 17 is provided with an opening 18, so that the oil may lubricate the outer surface of the sleeve 19, thus ensuring the free sliding movement of the members 14 and 17, upon the member 19.

The bushing 17 has a force or drive fit within an end cap 20, and this end cap 20 is provided with ball-bearings 21 which are held in place by means of a washer 22. The washer 22 is held in place by means of a removable ring 23. This ring 23 fits within a suitable groove of the cap 20. If desired, the bushing 17 can be detached from the cap 20 by means of a suitable tool or the like, so that the parts can be readily assembled and taken apart.

The pulley 7 is a split-pulley and each half of the pulley 7 is provided with a web 24. The webs 24 can be connected to each other by means of screws 25, so that the two halves of the pulley 7 are tightly clamped in position upon the sleeve 14. Hence, the pulley 7 and the sleeve 14 turn in unison.

As shown in Fig. 6, the two webs of the split-pulley 7 abut the angle or shoulder of the sleeve 14.

The pulley 7 and the clutch member 12 together with the cooperating parts, are longitudinally shifted by means of a shift member 26.

As shown in Fig. 3 for example, the shift member 26 is pivotally connected at 26a to a housing 28.

As shown in Fig. 1, the shift member 26 is connected to the treadle 27, by means of a link 28a, so that the shift member 26 is turned back and forth about pivot 26a when the treadle 27 is moved up and down.

As shown in Fig. 3, the shift member 26 is provided with a brake lining or member 29. When the treadle 27 is released, the parts move to the position shown in Fig. 1, in which position the brake member 29a operates against the periphery of the female clutch member 12, thus bringing the sewing machine to a stop. The sleeve 19 has a part of its inner periphery abutting the shaft 3, so that this part of the sleeve 19 acts as a bearing for the shaft 3.

As shown in Fig. 1, each of the upright legs of the frame is provided with longitudinally extending arms 30.

As shown in Fig. 4, an annular member or ring 31 is connected to said arms 30, by means of screws 32. The screws 32 have tapered points which fit into corresponding sockets which are provided in the ring 31, so that the ring 31 is firmly held in position. The housing 28 is held within the ring 31, by means of screws 34.

The housing 28 is provided with screws 35 which engage the sleeve 19, so that the sleeve 19 is held connected to the frame, through the intermediate parts described.

As shown in Fig. 6, the major portion of the interior periphery of the sleeve 19 clears the sleeve 3. This minimizes friction.

A coil compression spring 36 bears against the enlarged end of the sleeve 19, and against the enlarged end of the bushing 17, so that the clutch member 10 is held normally separated from the clutch member 12, as shown in Fig. 6. Since the spring 36 bears against bushing 17, and since the clutch member 12 can turn freely relative to bushing 17, said clutch member 12 can freely turn without turning or otherwise affecting the coil spring.

This saves considerable power, because the turning of the pulley is not restrained by the frictional resistance which would otherwise be caused by the spring.

As previously noted, the clutch member 10 always turns in unison with the shaft 3. When the shift member 26 is operated, the clutch member 12 is moved axially, being free to turn relative to the shaft 3, until the frictional drive is effected by the frictional engagement of the members 12 and 11. This frictional drive causes the split pulley 7 to turn, thus operating the respective sewing machine. The construction above mentioned prevents the spring 36 from exerting any binding effect upon the clutch member 12 so that the clutch member 12 is free to turn at all times until the friction drive is effective. The housing 28 is provided with an oil inlet 37 so that oil can be caused to enter the oil compartment 38. An oil distributing ring 39 of ordinary type is provided and this ring 39 is located in a cut-out portion of the sleeve 19, so that the oil can lubricate the shaft and permit it to turn freely within its bearing. The oil which is distributed by the ring 39 travels longitudinally so that it enters the compartment 40 of the housing 28, and the oil is then returned by means of a baffle-bushing 41 to the compartment 38, by means of the return passage 42, which is provided in the housing 28. The bushing 41 fits upon the shaft 3 and said bushing 41 has an integral external collar 41a which is connected to the shaft 3 by means of a screw 42a.

Referring to Fig. 7, the shaft 3 is provided with a collar 45 which is connected thereto by means of screws 46 so that the collar 45 and the shaft 3 turn in unison. The collar 45 is provided with axially extending drive pins 47 which fit slidably into recesses provided in a clutch member 48. Hence, the clutch member 48 turns in unison with the shaft 3 and the collar 45.

The shaft 3 turns within a stationary sleeve 49, which corresponds generally to the sleeve 19 previously specified. The shaft 3 has a clearance with respect to the fixed sleeve 49.

One end of the sleeve 49 is threaded, and a ball race 50 is held upon the end of the sleeve 49 by means of the threads shown in Fig. 7.

Balls 51 are provided and they are held in place by means of a washer 52 and a ring 53, the construction in this respect being similar to that previously described. The female clutch member 54 is of the general construction previously specified, and it is provided with a bushing 55 which corresponds to the bushing 17 previously described.

The sleeve 49 is surrounded by a sleeve 56, which serves as a bearing for the member 48. The sleeve 56 has a cut-out portion in which the coil spring 36 is located, and the coil 36 bears against the enlarged end of the bushing 55, so as to normally hold the members 48 and 54 separated.

In Fig. 7 said members 48 and 54 are shown in the operative or drive position.

The member 48 is provided with a chamber 60, into which oil can be injected so as to permit the free turning of the member 48 with respect to 56.

Fig. 9 shows how the shaft 3 is coupled to the motor shaft Ma. The shafts 3 and Ma are provided with collars 70 and 71 which are connected to said shafts by means of screws 70a and 71a.

The drive is provided by a series of disks D, having cut-outs 72. The disks D are caused to turn in unison with the collars 70 and 71, by means of pins 73 and 73a, which enter the cut-outs 72. The disks D may be made of leather or other suitable material and they may be held together by a suitable adhesive or the like.

In order to set or assemble the coupling 4, the collar 70 may be suitably connected to the shaft 3 by means of the screws 70a, and the collar 71 may be then shifted along the motor shaft Ma, until the pins 73 and 73a pass through the cut-outs 72, as shown in Fig. 9, so that said shafts turn in unison, the drive being secured by the pins 73 and 73a and the disks 72, which are made of rigid leather or any other suitable material.

If the shafts Ma and 3 are not in exact alignment, the collar 71 may be laterally shifted as indicated by the dotted lines in Fig. 9. Hence, the coupling can be used even if the shafts are somewhat inclined to each other.

As shown in Fig. 6, the fixed sleeve 19 is held within the housing 28 by means of set-screws 35 so that a complete assembly is provided, whose parts can be readily assembled or detached from each other.

Referring to Figs. 6 and 7, it will be noted that a movable clutch member can be shifted without any binding. For example, in Fig. 6, an end-thrust ball-bearing is provided, so that the shift member 26 cannot bind against the slidable clutch member. Likewise, the spring 36 bears against the enlarged head of the bushing 17, and the sleeve 14 may turn freely with respect to the bushing 17, so that the end-thrust of the spring 36 does not prevent the free turning of the longitudinally slidable clutch member.

Even if the bushing 17 and the sleeve 14 turn in unison, it will be noted that the spring 36 bears against a stationary member 19, so that the slidable clutch member 12 can be freely shifted without causing it to turn, until the friction drive becomes effective.

The same advantages result from the construction shown in Fig. 7.

Comparing Figs. 3 and 6 with Fig. 12, that part of the sleeve 19 which serves as a bearing for the shaft 3 is replaced by a sleeve 70 which is mounted in annular projections 71 of an outer sleeve 72. The outer sleeve 72 corresponds to the member 28 shown in Fig. 3, and said outer sleeve 72 is suitably held to the frame of the machine. The sleeve 72 has a slot 73 and the sleeve 70 has a slot 74, in which a distributing ring 75 is located, so that the oil passes to the outside of the shaft which is located within the bearing sleeve 70, and said oil can accumulate in the chamber 76 which is provided in the bottom of the sleeve 72. The oil-distributing ring 75 is turned to a certain extent by its frictional contact with the shaft 3 which is located within the sleeve 70, so that said ring 75 acts to distribute the oil between the exterior periphery of the shaft 3 and the interior periphery of the sleeve 70, in the usual manner.

Referring to Fig. 13, the inner or bearing sleeve 70 is retained within the outer sleeve 72 by means of set-screws 77.

The sleeve 72 is provided with an oil-inlet 73a. When oil is dropped into the inlet 73a, air can escape through the slot 73.

Comparing Fig. 6 and Fig. 12, the left-hand end portion of the sleeve 19, upon which the spring 36 and certain other parts are located, is replaced by a separate sleeve 78, which can be cast into the flange of the sleeve 72.

The set-screws 34 which are shown in Fig. 6 and also shown in Fig. 13, are the means by which the member 72 is held.

The flange at the left-hand of the sleeve 19 (which is illustrated in Fig. 6) is replaced by a separate ring 19a which is retained by means of a spring ring 19b which partially fits into a groove formed in the sleeve 78. The left-hand end of the sleeve 78 is slightly enlarged in order to retain the split-ring 19b.

We have shown a preferred embodiment of our invention, but it is clear that numerous changes and omissions can be made without departing from its spirit.

We claim:

1. A transmission drive comprising a shaft, a first clutch member connected to said shaft so as to turn therewith, a fixed sleeve through which said shaft extends, a second clutch member through which said fixed sleeve passes, said second clutch member being longitudinally shiftable with respect to said first clutch member, an end-thrust anti-friction member in which one end of said second clutch member is located, a shift member adapted to press against said anti-friction member in order to shift said second clutch member, and spring means adapted to keep said second clutch member normally separated from said first clutch member.

2. A transmission drive comprising a fixed sleeve, a shaft passing through said fixed sleeve, a first clutch member connected to said shaft so as to turn in unison therewith, a second clutch member through which said sleeve passes, said second clutch member having a bushing at its inner periphery which abuts said fixed sleeve, a spring having one end thereof abutting said bushing and having the other end thereof abutting the adjacent end of said fixed sleeve, said spring being adapted to normally hold the second clutch member separated from the first clutch member, one end of the second clutch member being located within anti-friction means constituting an end-thrust device, and a shift member adapted to be pressed against said anti-friction means.

3. A transmission drive comprising a fixed sleeve, a shaft passing through said fixed sleeve, a first clutch member connected to said shaft so as to turn in unison therewith, a second clutch member through which said sleeve passes, said second clutch member having a bushing at its inner periphery which abuts said fixed sleeve, a spring having one end thereof abutting said bushing and having the other end thereof abutting the adjacent end of said fixed sleeve, said spring being adapted to normally hold the second clutch member separated from the first clutch member, one end of the second clutch member being located within anti-friction means constituting an end-thrust device, and a shift member adapted to be pressed against said anti-friction means, and lubricating means adapted to lubricate the adjacent surfaces of said fixed sleeve and of said bushing.

4. A transmission drive comprising a fixed sleeve, a shaft passing through said fixed sleeve, a first clutch member connected to said shaft so as to turn in unison therewith, a second clutch member through which said sleeve passes, said second clutch member having a bushing at its inner periphery which abuts said fixed sleeve, a spring having one end thereof abutting said bushing and having the other end thereof abutting the adjacent end of said fixed sleeve, said spring being adapted to normally hold the second clutch member separated from the first clutch member, one end of the second clutch member being located within anti-friction means constituting an end-thrust device, and a shift member adapted to be pressed against said anti-friction means, and lubricating means adapted to lubricate the adjacent surfaces of said fixed sleeve and of said bushing, said lubricating means comprising a mass of absorbent material located within said clutch member, said bushing having an opening therein.

5. A transmission comprising a shaft, a collar member mounted on said shaft and connected thereto so as to turn in unison therewith, a fixed sleeve through which said shaft passes, a second sleeve mounted upon said fixed sleeve, one end of said second sleeve abutting an anti-friction end-thrust bearing which is fixed to said fixed sleeve, a first clutch member also having an end portion thereof abutting said anti-friction means, connecting means between said collar and said first clutch member so that said collar and said first clutch member turn in unison with said shaft, a second clutch member through which said fixed sleeve passes, and a spring having a portion thereof located within a recess of said second sleeve, said spring having an end thereof effective to slide the second clutch member away from the first clutch member.

HENRY SHAPIRO.
ISAAC JOFFE.